Dec. 3, 1935.  W. E. CURRY  2,022,802
SAFETY DRIVING ARM FOR AUTOMOBILES
Filed Feb. 14, 1935
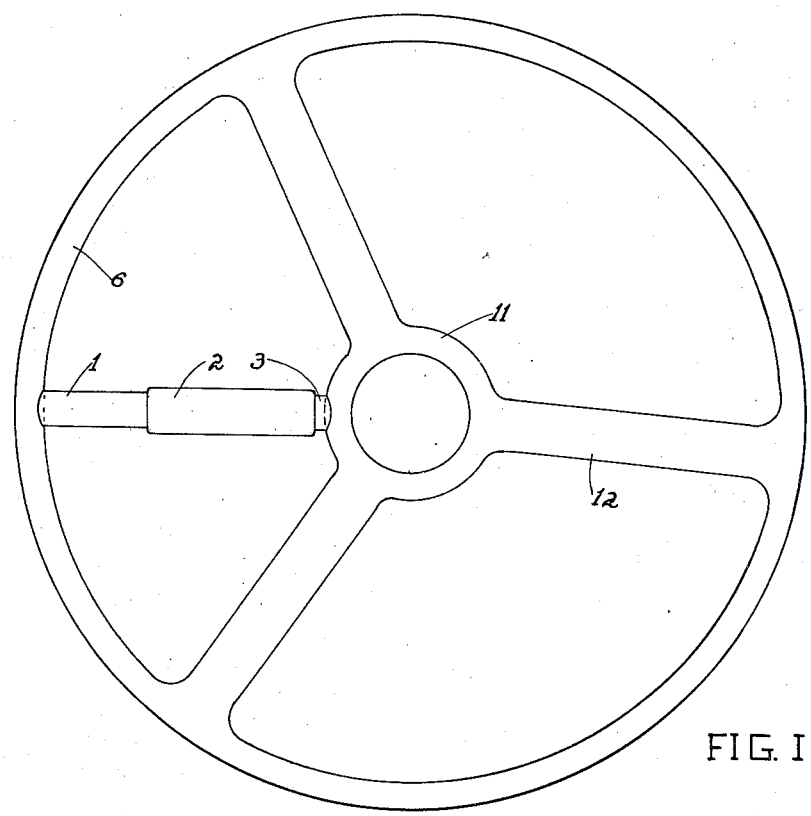
FIG. I.
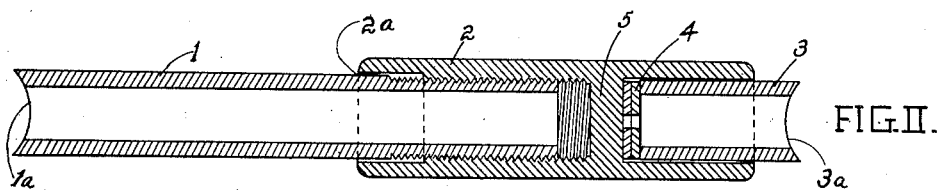
FIG. II.
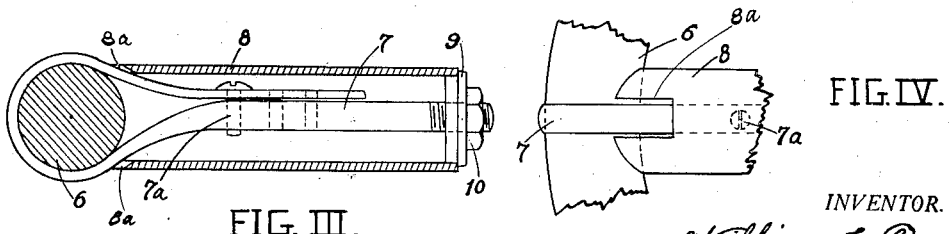
FIG. III.   FIG. IV.
INVENTOR.
BY *William E. Curry*
ATTORNEY Patented Dec. 3, 1935

2,022,802

UNITED STATES PATENT OFFICE 2,022,802

SAFETY DRIVING ARM FOR AUTOMOBILES

William E. Curry, Louisville, Ky.

Application February 14, 1935, Serial No. 6,445

3 Claims. (Cl. 74—552)

My invention relates generally to safety devices adapted for driving automobiles and applicable specifically to the steering wheels. And the principal object of my invention is to design a practical handle attachment adapted to be removably fixed to the driving wheels of automobiles in a predetermined position to aid the driver to operate the wheel positively and safely. Another object of my invention is to devise a safety driving arm for automobiles that will be simple and strong in construction and economical in fabrication and readily attached or removed from the driving wheel.

With the above and other objects in view which will appear in the process of the description, it will be seen that my invention, the new and useful safety driving arm for automobiles, illustrated in the accompanying drawing which forms a part of this specification, is a practical device embodying said novel means and other new and useful details of construction, arrangement and combination of parts all of which together with their functions, will be described in detail with reference to said drawing and will be definitely pointed out in the claims that follow this description, so that any person skilled in the art may understand how to construct and use this device.

In said drawing Fig. I is a plan view of the driving wheel of an automobile with my fulllength safety driving arm fixed in the wheel between the hub and the felly in its service position.

Fig. II is a side view, in longitudinal section, of my full-length safety driving arm, showing its consistent parts and their relative positions in service.

Fig. III is a side view, partly in section and partly in elevation, of my half-length safety driving arm set in its service position on a fragment of the driving-wheel felly.

Fig. IV is a vertical projection of a fragment of my half-length safety driving arm and a fragment of the felly to which it is attached.

This invention has been designed and developed in its various details for the purpose of enabling the driver of an automobile to have a strong and positive hold on his driving wheel in case of emergency without being obliged to keep a continuous firm and wearisome grip on the smooth felly of the wheel. For my safety driving arm may be set in the wheel in any predetermined position which is comfortable for the driver. And with these purposes and the special objects aforesaid in view, I will now describe my invention at length, pointing out specifically the new and useful features and explaining the purpose and the operations of the individual parts and the combinations thereof, as illustrated in the drawing hereinabove described in which similar letters and characters refer to similar parts throughout the several views.

In the design and construction of my new fulllength safety driving arm, I have provided a tubular part 1 of certain length having a curved depression at its outer end adapted to fit the convex surface of the inner curve of the felly of a driving-wheel of an automobile and having its inner portion threaded back a certain distance and adapted to screw into an extension-coupling 2 to a greater or less extent for the purpose of adjustment and also for the purpose of installation between the felly 6 and the hub 11. In the threaded end of said coupling a short, smooth counterbore 2a has been cut in to help cover the threads of the tubular part when assembled therein. But as some driving-wheels have a much greater diameter than others, I have provided an auxiliary extension tube 3 adapted to telescope into the smooth, hollow end of the extension-coupling 2 and designed with a square-cut inner end to rest evenly against the partition 5 in the extension-coupling 2 or against a plurality of washers 4, 4, as shown in Fig. II, which may be placed therein for the purpose of extending the effective length of the safety arm when prepared for installation in a very large driving-wheel. But the outer end of the auxiliary extension tube 3 has a curved depression 3a adapted to fit the curved outer surface of the edge of the hub 11 of the steering wheel. And if the hub 11 of the driving wheel is of such a shape as to afford no sure support for the auxiliary extension tube 3, my half-length safety driving arm should be used on such a driving wheel.

In my half-length arm a flexible hook 7 is used which has a thin flat part adapted to pass around fellies of various sizes to be fastened with the setscrew 7a to the heavy shank part which is cylindrical and threaded on its end portion and provided with a plurality of adjusting screw-holes therethrough.

Over this hook 7, I slide a sleeve 8 of certain length slightly shorter than the hook and adapted with a curved depression in one end to fit against the convex inner surface of the felly 6 and with a square-cut at the other end.

The washer 9 is provided with a centrally-disposed circular boss adapted to fit closely into the square-cut end of the sleeve 8 to hold the washer concentric with the sleeve in its service position. The washer 9 with its integral boss is provided with a central boring through it designed to allow the washer 9 to be slipped on over the threaded end of the cylindrical shank of hook 7. And the nut 10 is adapted to screw onto the threaded end of hook 7 to hold the washer 9 in place and to force the sleeve 8 back securely against the felly 6, and at the same time, to tighten firmly the grip of the hook 7 upon the surface of the felly, a movement which securely locks the half-length safety driving arm strongly and rigidly to the felly of the driving wheel.

The sleeve 8 is shown in longitudinal section in Fig. III where the washer 9, the nut 10 and the hook 7 are shown in elevation. And in the end of the sleeve 8 resting against the felly there are clearance notches 8a, 8a, cut back a little way to afford room for the passage of the thin part of hook 7 around the felly, when the sleeve is in its service position, as shown in Figs. III and IV.

In the assembling and the installation of my full-length safety driving arm, we first screw the tubular part 1 into the threaded end of the extension coupling 2, a certain distance according to the estimated radius of the driving wheel; and we next insert the square-cut end of the auxiliary extension tube into the smooth, hollow end of the extension coupling until it rests down against the partition 5 or against one or more washers 4, 4, installed therein to lengthen the reach of the driving arm. The deep circular depression is cut in the other end of the auxiliary extension tube for the purpose of fitting the end of the tube on over the convex ridge of the hub 11 to prevent the end of said tube from slipping on the hub and also to prevent the tube from rotating when it is assembled and the extension coupling is rotated, as it is when the safety arm is being installed or removed, a rotary movement in which the smooth partition or the washers pass readily in rotation over the smooth square-cut end of the extension tube.

We then place the outer end of the extension tube 3, with its curved depression fitted firmly against the convex surface of the hub 11 of the driving wheel, in a position desired by the driver. Then, holding in one hand the tubular part 1 directed radially towards the felly 6 and turned to fit the convexity thereof, we rotate with the other hand the extension coupling 2 in such a direction as will move the tubular part 1 outward towards the felly 6 and force the curved end 1a of the tube firmly against the inner convex surface of the felly 6, while the concave end of the extension tube 3 still rests firmly against the convex surface of the hub 11. In this way the safety driving arm may be installed strongly and rigidly in the driving wheel of an automobile in any position where it will be convenient and comfortable for the driver.

In my present specification I have shown and described specific details of my full-length and half-length safety driving arm for automobiles. But it should be understood that these specific details herein illustrated and described, are not to be considered as limitations of the practical construction of my invention, and that, while keeping within the scope of my invention and claims, I may make use of any desired modification of these details to facilitate production or to economize in the fabrication of the parts, provided I keep within the spirit of the invention.

And, now, having thus described the various features of my invention, the detail construction, arrangement and combination of its parts as well as its purposes and methods of application and use; those features and combinations of my invention that I consider new and useful, economical and efficient for safety in driving automobiles, and on which I desire Letters Patent granted to me, I have hereinbelow set forth specifically in the following claims.

I claim:—

1. In a safety driving arm adapted to be installed between the hub and felly of the driving-wheel of an automobile,—a tubular part having a curved depression in its outer end adapted to fit the convex surface of the inner curve of the felly of said driving-wheel, and having threads along its inner end portion; an extension coupling adapted to screw on over the inner end of said tubular part for the purpose of the installation, the adjustment and the removal of said arm, and provided, further, with a smooth axial boring in the other end and a partition between said borings; an auxiliary extension tube having a square-cut inner end adapted to telescope into the smooth-axial boring of said coupling and designed with a curved depression at its outer end to fit securely against the convex surface of the hub of the driving-wheel of an automobile; and a plurality of washers adapted to be placed into the smooth boring of the extension coupling between the partition therein and the square-cut end of the extension tube to lengthen the reach of said safety driving arm.

2. In a safety driving arm adapted to be installed between the felly and the hub of the driving wheel of an automobile,—a tubular part of predetermined length; a curved depression in the outer end of said tubular part; threads along a certain portion of the inner end of said tubular part; a cylindrical extension coupling; a threaded axial boring in one end portion of said coupling adapted to screw on over the threaded-end of said tubular part; a short, smooth counterbore in the end of said threaded boring designed to cover some of the threads on the end portion of said tubular part, when assembled in its service position; a smooth, axial boring in the end of said coupling opposite the threaded axial boring; a partition between said axial borings; an extension tube with a square-cut end adapted to telescope into said smooth, axial boring to rest against said partition; and means at the outer end of said extension tube to prevent its rotation when fitted against the hub of said driving-wheel for installation by the rotation of said extension coupling, as described.

3. For an automobile driving-wheel an auxiliary, safety driving-arm, adjustable between the hub and felly thereof, and comprising: a round tube having external threads on a position of one end and a curved depression in the other end adapted to fit the convex surface of the inner portion of the felly of said driving-wheel; a cylindrical extension-coupling provided with a short, smooth, axial bore at one end thereof and a longer, threaded bore at the other end, adapted to screw on over the threaded end of said round tube; a rigid partition fixed in said coupling between said two bores; an auxiliary extension tube adapted to telescope into the smooth bore of said coupling and provided with a square-cut on its inner end and a curve depression in its outer end, designed to fit snugly on over the convex surface of the hub of said driving wheel; and means for adjusting the position of said auxiliary extension tube in said short, smooth bore to help adjust the length of said driving arm.

WILLIAM E. CURRY.